United States Patent Office 3,299,702
Patented Jan. 24, 1967

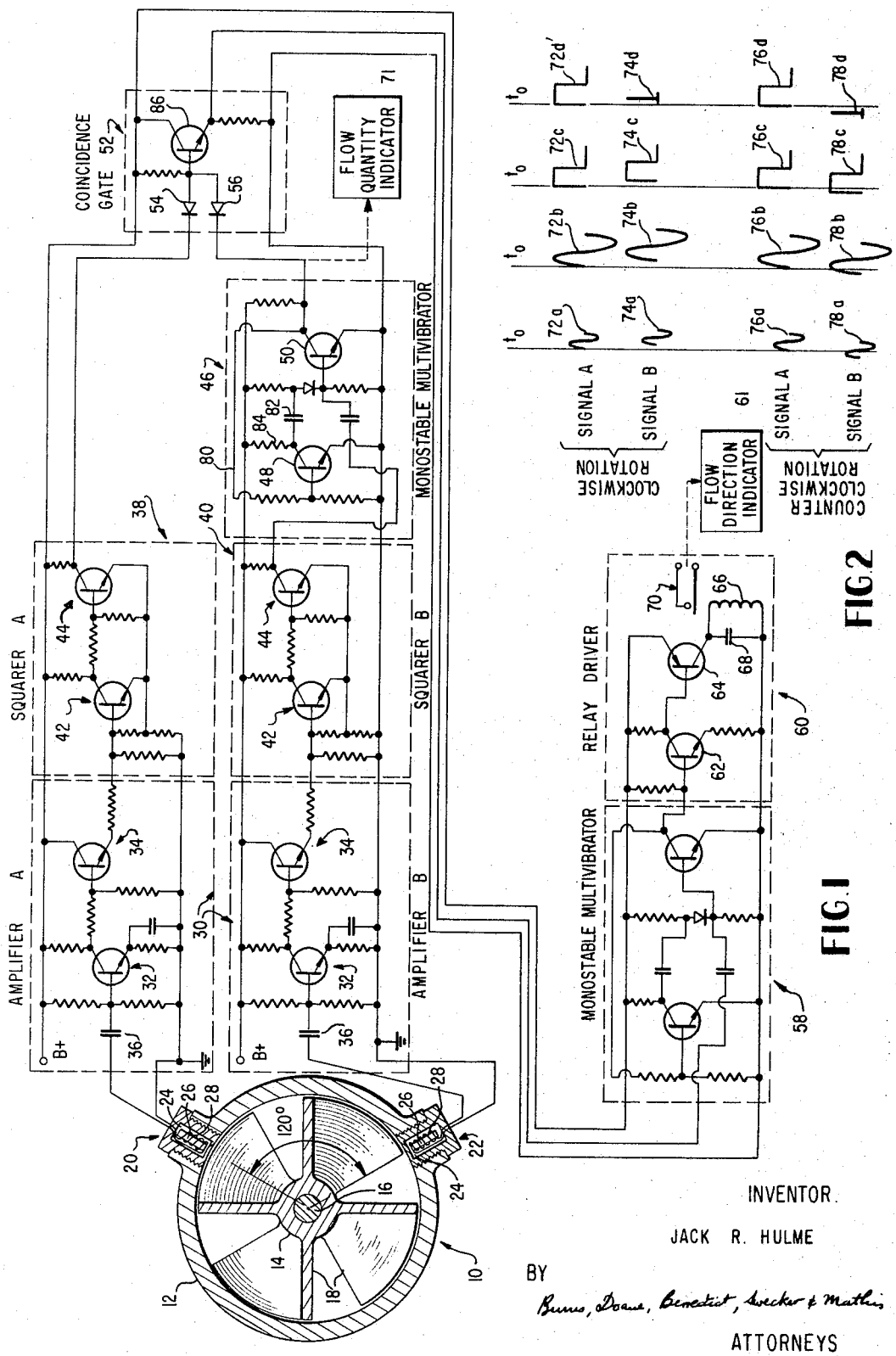

3,299,702
FLUID FLOW DIRECTION INDICATOR
Jack R. Hulme, Duncan, Okla., assignor to Halliburton Company, Duncan, Okla., a corporation of Delaware
Filed Nov. 19, 1963, Ser. No. 324,799
7 Claims. (Cl. 73—188)

This invention relates in general to apparatus for determining the direction of fluid flow in a conduit. More particularly, this invention relates to a novel electronic apparatus for deriving time spaced signals in response to the vane rotation of a rotor axially disposed within a conduit, and for determining the relative order of precedence of such signals as an indication of the direction of fluid flow.

Determination of fluid flow direction in a conduit is a matter of considerable practical difficulty and importance. Particularly where fluid characteristics or pressures require conduit integrity, flow direction determination has remained a problem in the art. In normally unidirection flow systems, flow reversal may characterize emergency conditions. For conduits reversibly feeding storage chambers, knowledge of flow direction is of great utility, particularly when coupled with flow metering. In particular, the present invention provides for flow direction determination in a closed conduit system by magnetic induction effects of conductive or magnetic vanes helically arranged for rotation responsive to fluid flow.

Therefore, the primary object of this invention is to provide a novel apparatus for determining the direction of fluid flow in a conduit.

A further object of this invention is to provide such apparatus which is electronically implemented, whose fluid exposed components are extremely rugged and abrasion resistant, and which is therefore particularly, although by no means exclusively, suitable for determining the flow direction of corrosive or abrasive fluids.

Another object of this invention is to provide such apparatus which may operate simultaneously as a rotating vane-type flow meter, to indicate flow quantity as well as direction.

Still another object of this invention is to provide such apparatus in which a pair of time-spaced electrical signals are derived from spaced probes mounted on the periphery of a conduit in response to the passage of vanes of a rotor axially disposed within the conduit past the probes, and in which the relative order of precedence of the electrical signals is then determined as an indication of the direction of fluid flow.

In accordance with a preferred embodiment of this invention, a vaned rotor is axially disposed within a tubular fluid-carrying conduit. The vanes of the rotor are canted in a helix fashion with respect to the rotor axis, much like a screw-type propeller, and present symmetrical configurations when viewed from either end of the rotor. The rotor is free to rotate about its axis in either direction in response to the passage of fluid through the conduit. The conduit itself may be part of a permanent fluid transfer system, or, in a well logging environment, may be open at both ends and incorporated into some parent structure adapted to be raised or lowered in a bore hole.

A pair of spaced electromagnetic sensing probes are externally mounted on the periphery of the conduit adjacent the rotor area and each probe produces an output pulse each time one of the rotor vanes passes beneath it. The probe construction itself forms no part of the present invention, and any one of several well known and readily available types could be used. For purposes of illustration, permanent magnet and coil-type probes have been shown, which are highly sensitive to vane proximity.

The output pulses from each probe are separately amplified and squared to produce unipolar pulses by identical, parallel channel electronic components, and the squared pulse output of one channel is used to trigger a first single-shot or monostable multivibrator which produces a voltage spike of much shortened duration. This first multivibrator output will therefore be in the form of a series of voltage spikes each having a short duration coincident in time with the leading edges of its triggering squared pulses. The squared pulse output of the other channel and the spike output of the first multivibrator are then applied to a coincidence or AND gate which produces an output pulse only when its two input signals are coincident in time. The coincidence gate output is used to trigger a second monostable multivibrator pulse stretcher having a delay time which is considerably longer than the delay time of the first one.

The output of the second multivibrator is then amplified by a relay driver circuit and applied to a capacitively shunted relay coil. The capacitor serves to smooth out the relay current and eliminate contact chatter.

During rotor operation responsive to flow in one direction, theh system operates to maintain the relay energized continuously, while, as will appear below, flow in the opposite direction will not energize the relay. The relay contacts may be connected to any suitable output device, such as an indicator lamp circuit, and the energization of the relay will then indicate a first fluid flow direction, while the de-energization of the relay will indicate a second, reverse fluid flow direction.

Further objects and advantages of this invention will be apparent to those skilled in the art from the following description thereof taken in conjunction with the accompanying drawing in which:

FIGURE 1 is a schematic representation of a preferred embodiment of the invention showing exemplary rotor and probe constructions and the electronic circuitry employed, and FIGURE 2 is a diagrammatic waveform representation of some of the electrical signals developed during the operation of the various components.

Referring now to FIGURE 1, reference numeral 10 designates generally a cross-sectional view of the rotor and probe assembly including a tubular fluid conduit 12 and an axially disposed rotor 14. Rotor 14 is free to rotate about a central shaft 16 in either direction, depending on the direction of fluid flow through the conduit. The rotor is provided with helically canted vanes 18 which are normal to shaft 16 and extend outwardly therefrom to substantially the inner diametrical limits of conduit 12. The rotor's rotational speed is proportional to flow velocity, while the direction of rotation is dependent on the direction of flow. A pair of electromagnetic pickup probes 20 and 22 are threadably mounted on the outer periphery of the conduit and contain central enclosed cylindrical cavities 24 which are sealed from the fluids flowing through the conduit. Each of the cavities 25 houses a vane detector such as a rod-like permanent magnet 26 surrounding by a sensing coil 28.

It will be noted that in the embodiment shown rotor 14 is provided with four equally spaced vanes 18 and probes 20 and 22 are displaced from each other on the periphery of the conduit by 120 mechanical degrees. While any number of compatible vane and probe spacing arrangements are available, it is desirable that the probes be peripherally separated from each other by an angle of at least 10 electrical degrees to avoid switching errors. If both probes developed output signals at approximately the same instant in time in response to the passage of two different rotor vanes, the switching time requirements of the monitoring circuitry would be greatly increased and erroneous output indications could easily occur. With probes of the type mentioned, they may be separated as much as 170 electrical degrees at the most.

In the present system, for one direction of rotation, it is desired that the output signal of preselected polarity of one probe subsist until the initiation of the signal of the same polarity by the other probe has begun.

In arriving at a compatible spacing arrangement, the mechanical separation between adjacent rotor vanes is taken to be 360 electrical degrees. In the embodiment shown, therefore, 90 mechanical degrees are the equivalent of 630 electrical degrees, and consequently, the 120 mechanical degrees separating the two probes become the equivalent of 480 electrical degrees. Subtracting the 360 electrical degrees representing one full cycle from this last figure leaves a difference angle of 120 electrical degrees, which meets the requirement of falling between 10 and 170 electrical degrees. In a similar manner, if the rotor contained six equally spaced vanes, a probe separation of 20 or 80 mechanical degrees would be the equivalent of 120 electrical degrees.

The necessary separation in the electrical phase angle of the probe signals can be obtained, with a sufficiently long rotor, by axially displaced probes in the same radial plane of the housing. In this configuration, the helical pitch of the rotor and the axial probe spacing determines the phase angle delay.

It will be further appreciated that a rotor and vane construction of this type is extremely rugged and abrasion resistant, which characteristics are essential when the apparatus is used in a well logging environment where the drilling mud normally contains numerous sharp earth cutting fragments.

The output leads from probes 20 and 22 are connected to identical transistor amplifiers 30 each including a common-emitter amplification stage 32 and an emitter-follower output buffer stage 34. The amplifiers 30, and certain other circuit components later to be described, are also identified on the drawing by their respective channel designations A and B. Blocking condensers 36 decouple the probes from operating potentials of the transistors, while applying the sensing signals thereto. The full schematic diagrams of the amplifiers and the further circuit components have been presented in the interest of completeness. Since, however, all of these components have conventional configurations well known to those skilled in the electronic arts, a detailed desription of the function and operation of the individual elements thereof, such as the various resistors, capacitors, etc., is not considered to be necessary here.

The outputs of amplifiers 30 are coupled to identical squarers 38 and 40, each including transistor stages 42 and 44, which produce unipolar square wave pulses corresponding to the amplified sensing signals supplied by the amplifiers. The output of squarer 40 triggers a first single-shot or monostable multivibrator 46 having a very short delay time which may produce a pulse output of approximately one microsecond. While the time duration of the square wave pulses produced by the squarer 40 will vary in accordance with the rotor speed, it will be appreciated that the voltage spikes produced by the first multivibrator 46 will be of relatively short duration as compared with the square wave pulse. The multivibrator includes cross-coupled transistors 48 and 50, a feedback loop 80, a coupling capacitor 82, and a collector resistor 84. The outputs from the squarer 38 and the first multivibrator 46 are connected through negatively poled diodes 54 and 56 to an AND gate 52 which includes a transistor 86.

The output of gate 52 is connected to a second monostable multivibrator 58 having a delay time which is considerably longer than the duration of the average square wave pulse produced by squarer 40. Its transient condition may persist as long as one second, so that during periodic gate conduction, characterizing the selected flow direction, it is in operation substantially continuously. Although the multivibrators 46 and 58 have identical circuit configurations, the parameters of the individual components therein are varied in order to produce the desired delay times. The output of the multivibrator 58 is applied to a two-stage, relay driver amplifier 60 including cascaded transistors 62 and 64 and a relay coil 66 shunted by a capacitor 68. The latter sustains the relay energization during momentary relaxation of multivibrator 58. The relay coil operates switch contacts 70, which may be connected to the input circuit of any suitable output device 61, such as a chart recorder or an indicator lamp functioning to indicate, record, or respond to the signal.

The operation of the preferred embodiment of the invention shown in FIGURE 1 will now be described, with further reference to the diagrammatic waveform diagram shown in FIGURE 2. As fluid passes through the conduit 12 and impinges against helical vanes 18, rotor 14 will rotate in a direction dependent upon the direction of fluid flow through the conduit. As the vanes pass under probes 20 and 22, they alter the magnetic fields established by permanent magnets 26 and these field alterations cause electrical signals to be induced in sensing coils 26. Typical sensing signals are indicated by reference numerals 72a, 74a, 76a, and 78a in FIGURE 2, all shown with respect to a reference time $t_0$.

The bodies or housings of the probes are preferably made from some non-magnetic, corrosion resistant material, such as aluminum bronze. The probe coils supply output signals responsive to the rate of change of the magnetic fields they encompass. With a ferromagnetic rotor, such changes are induced primarily by the high permeability of the nearest vane. With a non-magnetic conductive vane, the fields of eddy current induced therein generate the desired signal. The polarity and waveform of the probe output signals will be the same regardless of the direction of rotation of the rotor at a predetermined angular velocity.

As may be seen from FIGURE 2, if the vanes are rotating in a clockwise direction, as when the fluid is flowing "out of the drawing," the sensing signal 72a induced in the coil of probe 20 will precede in time the signal 74a produced by probe 22. Conversely, if the vanes are rotating in a counterclockwise direction, as when the fluid is flowing "into the drawing," the signal 76a will be induced in the coil of probe 20 subsequent to the signal 78a produced by probe 22.

The amplitudes of these spaced sensing signals are increased by the amplifiers 30, still retaining their original time relationships, as indicated by signals 72b, 74b, 76b and 78b in FIGURE 2. The amplified signals are applied to squares 38 and 40, where transistor stages 44 provide constant amplitude, squared output pulses of similar preselected polarity 72c, 74c, 76c and 78c having negligible rise and fall times, under the switching control of transistors 42.

The square pulse output 74c or 78c of squarer 40 is then applied as a triggering signal to the first monostable multivibrator 46 which produces an output voltage spike 74d or 78d which may be of approximately one microsecond duration. In operation, the square pulse triggering signal 74c or 78c is capacitively coupled to the base of output transistor 50, and the leading edge of the pulse causes normally conducting transistor 50 to immediately switch off, thus raising its collector output potential to a higher level. At the same time, the collector output of transistor 50 is applied via feedback loop 80 to the base of transistor 48, which immediately begins to conduct. As soon as the coupling capacitor 82 charges to a sufficient level, transistor 50 is abruptly switched on again, thus lowering its collector potential to the original level. The charging time of capacitor 82 is dependent upon its own value and that of collector resistor 84, and these parameters are chosen so as to provide an output voltage spike 74d or 78d of approximately one microsecond duration.

If the output pulses from squarer 38 and multivibrator 46 are coincident in time, as shown by waveforms 72d and 74d for clockwise vane rotation, diodes 54 and 56 of coincidence gate 52 will both be blocked at the same time, and gate transistor 86 will conduct during the brief interval of such pulse coincidence. The output pulse of the gate 52 triggers the second monostable multivibrator 58, which in turn produces a long positive output pulse preferably of approximately one second duration. This pulse is amplified by the relay driver transistor 62, whose output turns on transistor 64, thus energizing the relay coil 66. The relay contacts 70 will then close, and this condition is monitored by a suitable output device, as described earlier. The capacitor 68 serves to smooth out the relay current and prevent contact chatter. The energization of relay coil 66 will thus indicate a clockwise vane rotation and a corresponding first fluid flow direction through conduit 12.

If, on the other hand, the output pulses from squarer 38 and multivibrator 46 are not coincident in time, as shown by waveforms 76d and 78d for counterclockwise vane rotation, one or the other diodes 54 or 56 will be unblocked and conducting at any given instant. Under these conditions, gate transistor 86 will always remain off, the second multivibrator 58 will not be triggered, and the relay coil 66 will remain de-energized, thus indicating a counterclockwise vane rotation and a second, reverse fluid flow direction through the conduit 12.

It will be further appreciated by those skilled in the fluid metering art that the pulse output from either of probes 20 or 22 could concurrently be applied to a suitable counting device, not shown. Since the rate of rotation of rotor 14 is directly proportional to the rate of fluid flow through conduit 12, the number of probe pulses occurring per unit time, expressed in either analog or digital form, will constitute an accurate indication of the fluid flow rate. In such a manner, the dual functions of sensing flow direction and measuring flow rate could advantageously be implemented by a single vane and probe assembly, thus effecting a considerable economy of parts. In one such practical embodiment, the pulse output from either of squarers 38 or 40 could be applied directly to a digital counter.

The output signal from multivibrator 46 may also be fed to a flow velocity recorder or indicator 71. The frequency of these uniform pulses, and their integrand, both vary with flow velocity.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for determining the direction of fluid flow in a conduit comprising:
   (a) a vaned rotor axially disposed within a conduit,
   (b) first and second sensing means mounted adjacent said rotor for producing first and second electrical signals, at a relative phase angle of between 10 and 170 electrical degrees in response to the passage of each rotor vane past said means, and
   (c) coincidence means for determining the relative time precedence of each first and second signal, whereby one order of precedence indicates a first fluid flow direction and a reverse order of precedence indicates a second, reverse fluid flow direction.

2. An apparatus for determining the direction of fluid flow in a conduit comprising:
   (a) a vaned rotor axially disposed within a conduit,
   (b) first and second spaced apart sensing probes mounted adjacent said rotor on the periphery of the conduit for producing first and second electrical signals at a relative phase angle of between 10 and 170 electrical degrees in response to the passage of each rotor vane past said probes,
   (c) means for producing first and second squared pulses in response to each first and second signal, respectively,
   (d) means for producing a voltage spike in response to and coincident in time with the leading edge of each first squared pulse, and
   (e) means for time comparing the voltage spikes and the second squared pulses, whereby their coincidence in time indicates a first fluid flow direction and their lack of coincidence in time indicates a second, reverse fluid flow direction.

3. An apparatus for determining the direction of fluid flow in a conduit comprising:
   (a) a vaned rotor axially disposed within a conduit,
   (b) first and second magnetic sensing probes mounted adjacent the rotor and spaced from each other on the periphery of the conduit for producing first and second electrical signals at a relative phase angle of between 10 and 170 electrical degrees,
   (c) means for producing first and second squared pulses of the same polarity in response to each first and second signal, respectively,
   (d) means for producing a voltage spike having a relatively short time duration as compared with the duration of said squared pulses in response to and coincident in time with the leading edge of each first squared pulse, and
   (e) means for time comparing the voltage spikes and the second squared pulses, whereby their coincidence in time indicates a first fluid flow direction and their lack of coincidence in time indicates a second, reverse fluid flow direction.

4. An apparatus for determining the direction of fluid flow in a conduit as defined in claim 3 wherein the means for producing a voltage spike comprises a monostable multivibrator having a relatively short time delay as compared with the duration of the first squared pulse.

5. An apparatus for determining the direction of fluid flow in a conduit as defined in claim 3 wherein the means for time comparing comprises a coincidence gate, and further comprising:
   (a) a monostable multivibrator having a relatively long time delay as compared with the duration of the first squared pulse responsive to an output from the coincidence gate for producing an output pulse,
   (b) a relay, and
   (c) circuit means responsive to the output from the monostable multivibrator for energizing the relay as an indication of the coincidence in time between the voltage spikes and the second squared pulses.

6. An apparatus for determining the direction of fluid flow in a tubular conduit comprising:
   (a) a multi-vaned rotor axially disposed within a tubular conduit,
   (b) a first magnetic sensing probe mounted adjacent the rotor on the periphery of the conduit for producing a first electrical signal in response to the passage of each rotor vane past the first probe,
   (c) a second magnetic sensing probe mounted adjacent the rotor on the periphery of the conduit and spaced from the first probe for producing a second electrical signal spaced in time from the first signal in response to the passage of each rotor vane past the second probe,
   (d) a first amplifier connected to the first probe for amplifying each first signal,
   (e) a second amplifier connected to the second probe for amplifying each second signal,
   (f) a first squarer connected to the first amplifier for producing a first squared pulse in response to each amplified first signal,
   (g) a second squarer connected to the second amplifier for producing a second squared pulse in response to each amplified second signal, (h) a first monostable multivibrator connected to the first squarer for producing a voltage spike of short duration as compared with the duration of the first squared pulse in response to and coincident in time with the leading edge of each first squared pulse, (i) a coincidence gate connected to the second squarer and the first monostable multivibrator for producing an output signal only upon the coincidence in time of a second squared pulse and a voltage spike, (j) a second monostable multivibrator connected to the coincidence gate for producing an output pulse of long duration as compared with the duration of the first squared pulse in response to an output signal from the coincidence gate, and (k) an output circuit including a relay coil coupled to the second monostable multivibrator for energizing the relay coil in response to an output pulse from the second monostable multivibrator, whereby the energization of the relay coil indicates a first fluid flow direction and the de-energization of the relay coil indicates a second, reverse fluid flow direction.

7. An apparatus for determining the direction of fluid flow in a tubular conduit as defined in claim 6 wherein the first and second magnetic sensing probes are spaced from each other on the periphery of the conduit to produce sensing signals at a relative phase angle of between 10 and 170 electrical degrees.

References Cited by the Examiner

UNITED STATES PATENTS 3,029,637   4/1962   Fellows _____ 73—194

FOREIGN PATENTS 762,499   11/1958   Great Britain.

RICHARD C. QUEISSER, *Primary Examiner.*

J. J. SMITH, *Assistant Examiner.*